Figure 1:
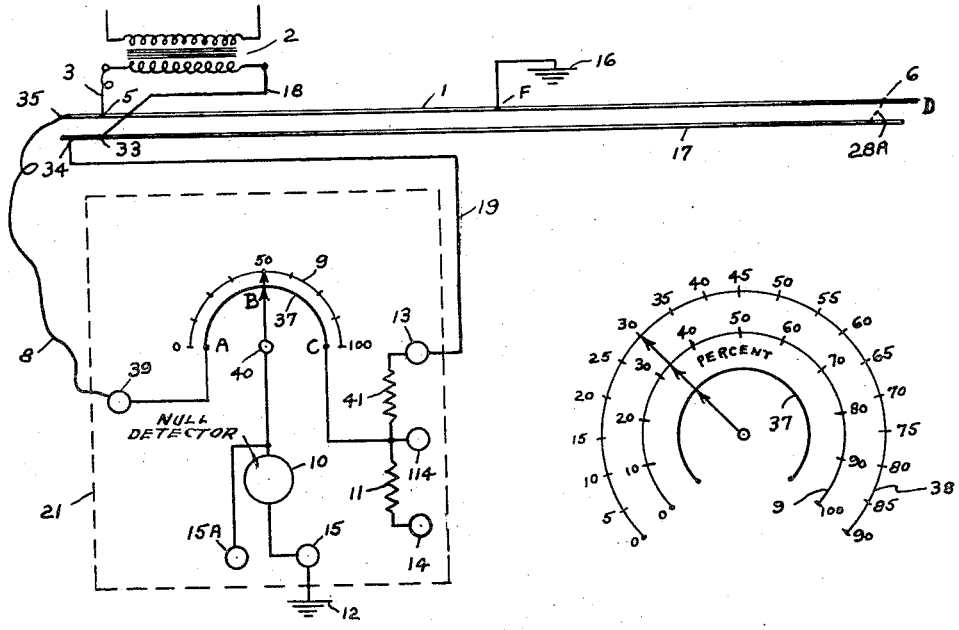

Oct. 17, 1939.　　S. W. BORDEN　　2,176,759

FAULT FINDING BRIDGE

Filed April 2, 1938　　2 Sheets-Sheet 1

Inventor
Stephen W. Borden

Oct. 17, 1939.  S. W. BORDEN  2,176,759
FAULT FINDING BRIDGE
Filed April 2, 1938    2 Sheets-Sheet 2

Inventor
Steffen W. Borden

Patented Oct. 17, 1939

2,176,759

UNITED STATES PATENT OFFICE 2,176,759

FAULT FINDING BRIDGE

Stephen W. Borden, Summit, N. J.

Application April 2, 1938, Serial No. 199,631

8 Claims. (Cl. 175—183)

My invention relates to devices of the slide wire type for use in a bridge arrangement for locating a defect in an insulated conductor which results in a fault or ground or an open-circuit.

One object of the invention is to provide a calibrated slide wire which will indicate, from 0 to 100%, the distance from one end of the defective conductor to the location of the fault, when there is available for testing purposes a parallel conductor having the same resistance as the defective conductor. Another object of the invention is to provide a slide wire combination having a scale which will indicate from 0 to 50% or more of the distance from one end of the cable to the fault, where there is no parallel similar conductor available for testing purposes. Another object is to provide equipment which may be used for the purpose mentioned, even when the defective conductor is alive and carrying a load and other objects as they may appear.

Figure 2:
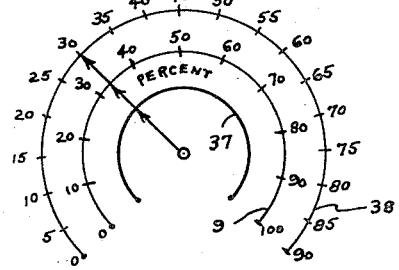

In the drawings,

Fig. 1 is a schematic layout showing the slide wire device connected for locating a fault when a return conductor is available. Fig. 2 shows a double scale for the slide wire and it is to be understood that such double scale is applicable to all of the figures, being omitted from some of clarity.

Figure 3:
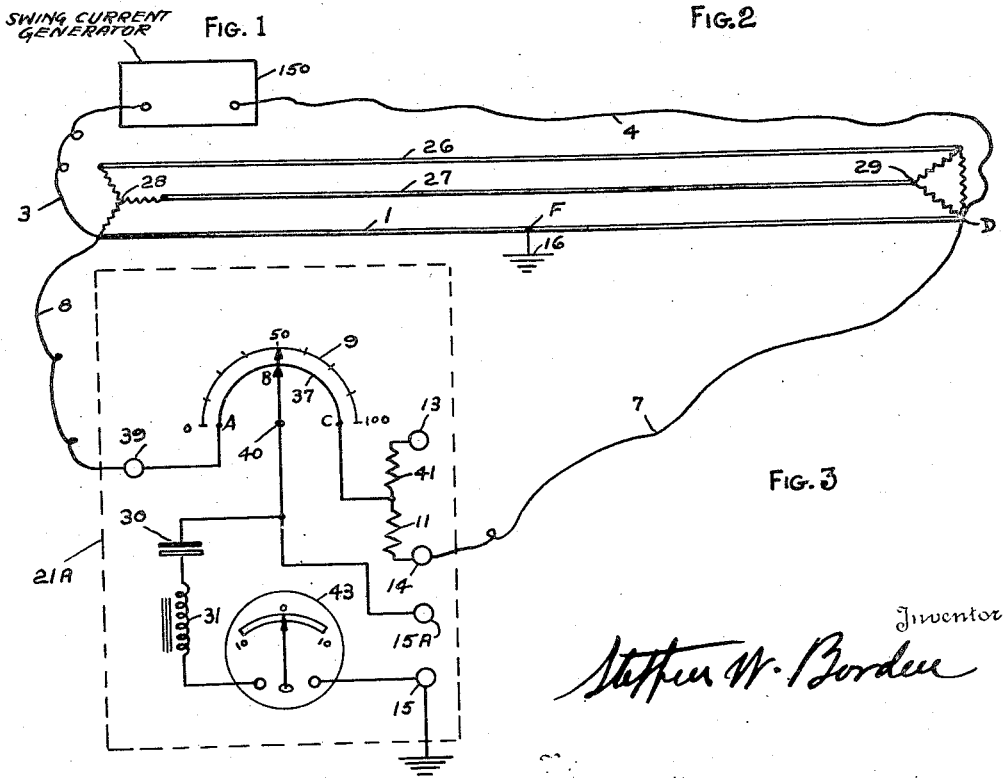
Figure 4:
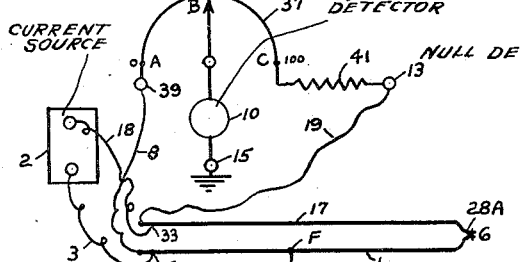
Figure 5:
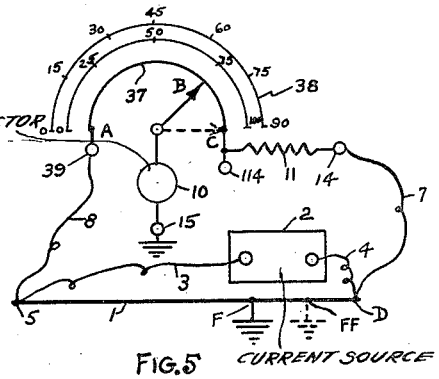
Figure 6:
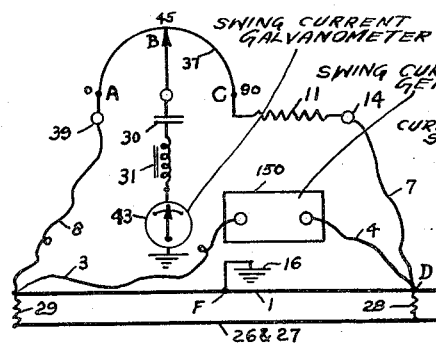
Figure 7:
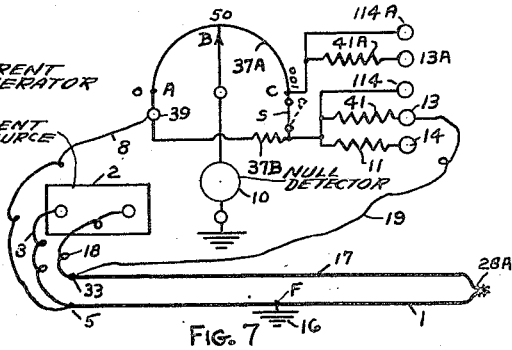
Figure 9:
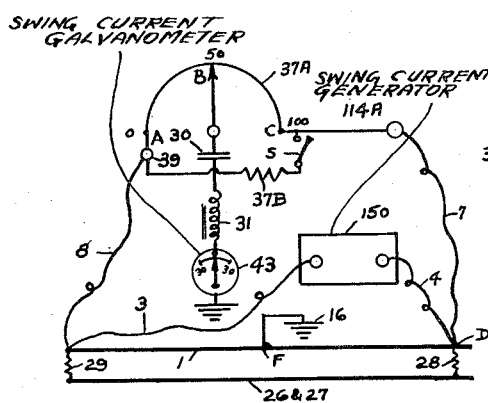
Figure 8:
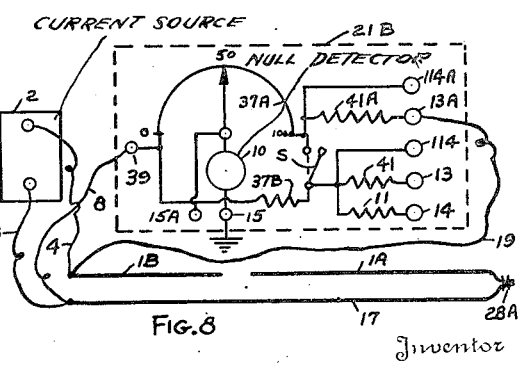

Fig. 3 shows the connections for making a test on a defective conductor which is one of the conductors of a system which is energized and supplying a load. Figs. 4, 5, and 6 are simplified diagrams for explaining the methods of measurement. Fig. 7 is a modified form connected for a ground test and Fig. 8 is the same form connected for an open circuit test. Fig. 9 is the modified form connected for a test on a live circuit.

Referring to Fig. 1—1 is a conductor in which a fault F has developed; 17 is a similar parallel conductor which is ungrounded; 2 is any suitable source of testing current, here assumed to be alternating; 21 is the measuring device and consists of a slide wire A—B—C having a sliding contact B pivoted at 40, a null detector, as 10, connected between 40 and a binding post 15 which is connected to ground. The slide wire is provided with a calibrated scale 9 marked from 0 to 100%. The zero end of the slide wire is connected to a binding post 39 and the other end of the slide wire is connected to a binding post 13 through a fixed resistance 41, and it is also connected to a binding post 14 through a resistance 11 and directly to post 114. The resistance 41 has the same value and temperature coefficient as slide wire A—B—C.

For use where no return companion conductor is available, I provide, as a part of the instrument, a cable 7, shown in Figs. 3, 5, 6, and 9, which is of sufficient length for practical purposes, 500 ft. being ordinarily sufficient. It is necessary that the circuit from the point C through the cable 7 to point D have a definite resistance valve and in order to avoid the necessity of calibrating the cable itself, I provide an adjustable make-up resistance 11 which is so adjusted that the total of the cable and resistance 11, in series, is a certain definite percentage of the resistance of the circuit A—B—C—D and which, for purposes of illustration, we will assume to be 10%. Since the resistance of cable 7 will vary considerably with changes of temperature, I prefer to make my slide wire A—B—C also of copper so that the relationship between the two resistance values will not vary with temperature changes.

When a return conductor, as 17 of Fig. 1, is available, the two conductors are connected together at the far end, as by jumper 28A; the near end of the defective conductor is connected to binding post 39, as by jumper 8; and the near end of the good conductor 17 is connected to binding post 13, as by jumper 19. One side of the test current source is connected by a jumper 3 to conductor 1 at a point 5 near its end but inside the connection 35, and the other side of the source is connected by a jumper 18 to conductor 17 at a point 33 near its end but inside the connection 34.

The source of supply 2 is of relatively low voltage but preferably capable of supplying as heavy a current as the conductors 1 and 17 can carry without injury. The slide wire A—B—C of Fig. 1 has a substantial resistance, a value of 20 ohms being suitable for many applications. The resistance of the circuits between the zero end of the slide wire and conductor 1 and from binding post 13 to conductor 17 must be low enough so that they will introduce no appreciable error in the readings and these conductors are hereinafter considered as having negligible resistance. Since a heavy testing current is employed, there may be appreciable voltage drop at the connections 5 and 33, but if the contacts 35 and 34 are made at points outside of the current-carrying contacts, voltage drop across contacts 5 and 33 will not be reflected in the measurements.

Referring now to Fig. 4, which is a simplified wiring diagram corresponding to Fig. 1 where a return conductor, as 17, is available. It will be seen that the connections result in a Wheatstone bridge arrangement having four arms, 5—A—B, B—C—33, 33—6—F, and F—5, the various components corresponding to the similarly marked parts of Fig. 1. It is assumed that conductor 17 has the same length and resistance value as conductor 1. If the fault F is located, say, half way between 5 and 6, then the slide wire A—B—C will be balanced when

5—A—B:B—C—33::5—F:F—6—33.

Now 5—F is equal to one-quarter of 5—6—33 and, as resistance 41 is equal to resistance A—B—C, it is obvious that the bridge is balanced when A—B equals B—C and this point, which is in the middle of the slide wire scale, is marked 50 on the dial and indicates that the distance from 5 to F is 50% of the distance from 5 to 6. It will be quite obvious that for any other location of F, the scale will be direct reading in percentage of distance to the fault if it is calibrated for zero to 100% over the resistance in slide wire A—B—C.

Referring now to Fig. 5, which is a simplified diagram corresponding to Fig. 1 connections when no return companion conductor is available and illustrates a use of the extension cable 7. It will be seen that in this case the bridge arms consist of A—B, B—C—D, D—F, and F—A, and for balanced condition A—B:ABCD::A—F:AFD. If now the bridge balances when B is at C, then $$\frac{AF}{AFD} = 90\%$$

since $$\frac{ABC}{ABCD} = 90\%$$

having been so calibrated, and if we provide a scale which is marked from 0 to 90% over the range of the slide wire ABC it will read directly the distance to the fault in percentage of conductor length. I prefer to provide my device with two concentric scales, one reading the percentage directly when a companion conductor is used and the other doing likewise when the extension bridge cable is used.

It will be noted that instead of using a second direct reading scale when the extension cable is used, $$\frac{AF}{AFD}$$

may be found by multiplying the reading on the 100% scale by $$\frac{ABC}{ABCD}$$

and this is very useful in cases where extension cable 7 cannot be used to advantage but where there is a return conductor available whose resistance is known, but different from that of the defective conductor, since such a return conductor may then be connected to binding post 114 and used in place of cable 7.

It will be apparent that a multiplicity of different lengths of cable 7 may be provided. They may be used separately or in series, and each cable or combination of cables may have its own direct reading scale.

If the fault be located, as indicated by FF, at a point nine-tenths of the way from 5 to D, then the bridge will balance when B is at the 90 point on scale 38, indicating that 5—FF is 90% of 5—D.

If this determination is not close enough, it is only necessary to make the tests from the other end of the conductors, as the fault will then lie within the first 10% of the length of the defective conductor.

Referring now to Fig. 3 and to Fig. 6, which is a simplified diagram corresponding to Fig. 3. Conductor 1 is defective at point F and conductors 26 and 27 are other conductors of the system which may be supplied from a transformer winding, as 28, and may have connected thereto motor windings, as 29. In making a test of this character, I utilize a swing current generator 150 and a swing current galvanometer 43 with a choke coil 31 and a condenser 30 in series with the galvanometer. The operation of the swing current equipment will be apparent to those skilled in the art. It is fully described in my co-pending application, Serial No. 199,625, and swing current generators are described in my co-pending applications, Serial Nos. 199,625, 199,626, 199,630, and 199,632.

Fig. 6 is substantially the same as Fig. 5 except that the conductor 1 has in multiple with it circuits consisting of conductors 26 and 27 connected thereto through resistances such as would be involved in the windings of transformer 28 and motor 29. This only results in reducing slightly the resistance of the circuit between the ends of conductor 1, and the resistance of conductor 1 is immaterial so far as the purposes of the test are concerned since it is only the relationship of the resistance between the two ends of the cable and the fault which we are dealing with. If the conductor is carrying load current, there will be a drop of potential between the ends of the conductor due to this load current which may be of some magnitude in a long, heavily loaded conductor; but those skilled in the art will understand that this potential, since it has the frequency of the power supply, will not interfere in any way with the making of the test or its accuracy. It will, however, result in causing a flow of power current through the swing current generator 150 via conductors 3 and 4 and also through the slide wire circuit but the normal construction of these circuits is such that the resulting current would not, in operating practice, be sufficient to cause any damage and when swing current testing is employed there will be no interference with the test. If the voltage drop along conductor 1, due to flow of power current, is sufficient to cause excessive current flow through the slide wire 37, the modified type of bridge shown in Figs. 7 and 8 should be utilized in the manner shown in Fig. 9.

Referring to Figs. 7, 8, and 9, slide wire 37A corresponds to slide wire 37 of the other figures but in this modified form it is made of relatively high resistance, say of the order of about 2,000 ohms, and it is then shunted by a shunt 37B, of relatively low resistance, connected through switch S. Resistance 41 is exactly equal to 37A and 37B in multiple while resistance 41A is exactly equal to 37A. I prefer to make the shunt 37B of copper so that temperature changes will not upset the relationship between the resistance of the shunt and the resistance of the extension cable. The resistance of the shunt is ordinarily not over 1% of the resistance of the high resistance slide wire which makes it unnecessary to construct the high resistance slide of copper, so far as the temperature error mentioned is concerned.

When making a conventional test to locate a ground fault, the connections are made as shown in Fig. 7, switch S being closed, and with the result that the test is being made with a slide wire of low resistance, which is desirable in order that the ratio of the bridge arms may not be too great, conductors 1 and 17 being of relatively low resistance.

Fig. 8 shows the connections when making a test for an open circuit. In this class of testing it is desirable to have a high resistance slide wire because the capacity of cables 1A and 1B and 17 are equivalent to relatively high resistances. It will be noted that switch S is open and that the low resistance bridge is not in service. It also will be noted that conductor 17, which may still be called the good conductor, is now connected to binding post 39 and when so connected the meter will read the percentage distance from the beginning of conductor 1 to the point of open circuit, the reversal of the connections being necessary because the greater the capacity of a cable the lower the corresponding effective resistance. With this arrangement, it is now permissible to use, say, 100 volts or more for testing while the limit is nearer 5 volts when the low resistance arrangement is used.

In Fig. 9 the modified bridge is shown connected in place of the low resistance bridge of Fig. 6. With this method of testing, the resistance of the extension circuit 7 is ignored and the 100% scale is used, and results in introducing a slight error but this is only on the order of about .05% if the resistance of 37A is 2,000 ohms and the resistance of cable 7 is 1 ohm. The accuracy with this connection will not be as high as when using the low resistance slide wire but this is not material because the length of conductor 1 is, in any case, relatively short while it has the advantage that the drop along conductor 1, due to the flow of power current, cannot possibly be great enough to injure slide wire 37A because of its high resistance.

The unitary devices 21, 21A, and 21B each includes a null detector connected between contact B and post 15 but it is to be understood that the detector may be a separate device connected to binding post 15A.

While I have described certain features more or less in detail, it will be understood that the invention will employ various devices of differing forms and construction and it is to be understood that the invention is not to be limited except by the scope of the appended claims taken in conjunction with the state of the prior art.

What I claim is:

1. A measuring device which includes a slide wire resistance element; a sliding contact on the resistance and arranged to be moved from end to end of the slide wire; a pointer arranged to move with the contact and over a scale which is marked "zero" at the position corresponding to one end of the slide wire and marked "100" at the opposite extreme end; a first binding post connected to the zero end of the slide wire and a fixed resistance, having a value equal to that of the slide wire, connected between the other end of the slide wire and a second binding post, and a null detector connected between the moving contact of the slide wire and a third binding post with a choke coil and a condenser in series.

2. A measuring device which includes a slide wire resistance element; a sliding contact arranged to be moved from end to end of the slide wire; a pointer arranged to move with the contact and over an alined duplex dial, both scales of which are marked "zero" at the position corresponding to one end of the slide wire and one of which is marked "100" at the opposite extreme end and the other of which is marked with a lower value than 100; a first binding post connected to the zero end of the slide wire and a fixed resistance, having a value equal to that of the slide wire, connected between the other end of the slide wire and a second binding post; an extension circuit which includes a portable, flexible, insulated conductor for connection to the last mentioned end of the slide wire and whose resistance value, in percentage of the resistance of the slide wire and itself in series, is equal to the difference between the full scale markings on the two scales and means, including a binding post, for connecting the extension circuit to the end of the scale; and means, including a binding post, for connecting a null detector between the moving contact of the slide wire and an exterior circuit.

3. A measuring device which includes a slide wire resistance element; a sliding contact arranged to be moved from end to end of the slide wire; a pointer arranged to move with the contact and over an alined scale which is marked "zero" at the position corresponding to one end of the resistance element; a binding post connected to the zero end of the slide wire, for connection to one end of the grounded conductor; an extension circuit of predetermined resistance value, which includes a portable flexible insulated conductor for connection between the other end of the slide wire and the other end of the grounded conductor and means, including a binding post, for connecting the extension circuit to the slide wire; and means, including a binding post and a lead, for connecting a null detector between the sliding contact and a binding post for connection to ground; the scale being marked at its upper end with a value equal to the percentage which the resistance of the slide wire is to the sum of the resistances of the slide wire and the extension circuit.

4. A measuring device which includes a slide wire resistance element; a sliding contact arranged to be moved from end to end of the slide wire; a pointer arranged to move with the contact and over an alined scale which is marked "zero" at the position corresponding to one end of the resistance element; a binding post connected to the zero end of the slide wire, for connection to one end of a grounded conductor; an extension circuit of predetermined resistance value, in the form of a portable flexible insulated conductor and a make-up resistance in series, for connection between the other end of the slide wire and the other end of the grounded conductor; means, including a binding post, for connecting the portable conductor to the make-up resistance; and means, including a binding post and a lead, for connecting a null detector between the sliding contact and ground; the scale being marked at its upper end with a value equal to the percentage which the resistance of the slide wire is to the sum of the resistances of the slide wire and the extension circuit.

5. A measuring device which includes a slide wire resistance element, a sliding contact on the resistance and arranged to be moved from end to end of the slide wire; and means, including a binding post and a lead, for connecting a null detector to the sliding contact; a first binding post connected to the zero end of the slide wire, for connection to an exterior circuit and a fixed resistance connected between the high end of the slide wire and a fourth binding post for connection to an exterior circuit; the said fixed resistance and the slide wire having equal ohmage; a low resistance shunt having one end connected to the zero end of the slide wire and having its other end connected, via a switch, to the high end of the slide wire and also connected, via a fixed resistance, to a fifth binding post for connection to an exterior circuit, the ohmage of the last-mentioned fixed resistance being equal to the ohmage of the slide wire and the shunt in multiple.

6. A resistance device for use in combination with a source of current, a null detector, and two portions of a defective copper conductor to form a Wheatstone bridge in which the two portions of the defective conductor constitute two arms of the bridge; the resistance device including a copper circuit divisible into two parts by a sliding contact the two parts constituting the remaining two arms of the Wheatstone bridge, one of said parts including a flexible portable extension conductor the resistance of which bears a definite and predetermined relation to the resistance of the balance of the copper circuit.

7. A measuring device which includes a slide wire resistance element; a sliding contact on the resistance element and arranged to be moved from end to end of the resistance; a pointer arranged to move with the contact and over a scale; a binding post connected to each end of the resistance for connection to an external circuit; and a swing current null detector, with a condenser and a choke coil in series, connected between the sliding contact and a third binding post for connection to an exterior circuit.

8. The combination of a resistance device with a source of current, a null detector, and two portions of a defective conductor to form a Wheatstone bridge in which the two portions of the defective conductor constitute two arms of the bridge with a bridge junction at the point of defect; the resistance device including a slide wire resistance having a sliding contact, a make-up resistance and a flexible portable extension conductor all in series and the total resistance of the make-up resistance and the flexible conductor having a definite and predetermined relationship to the resistance of the slide wire resistance, and the resistance device being so connected that a portion of the slide wire resistance between one of its ends and the sliding contact forms a third arm of the bridge and the balance of the slide wire resistance and the make-up resistance and the flexible conductor in series form the fourth arm of the bridge, the source of current being connected between two diagonally opposite junctions of the arms and the null detector being connected between the remaining two junctions in the conventional manner.

STEPHEN W. BORDEN.